United States Patent
Yatagai

(10) Patent No.: US 6,279,382 B1
(45) Date of Patent: Aug. 28, 2001

(54) SEALED VESSEL AND METHOD OF TESTING THE SAME

(75) Inventor: Tsuyoshi Yatagai, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/247,399

(22) Filed: Feb. 10, 1999

(30) Foreign Application Priority Data

Feb. 10, 1998 (JP) .................................................. 10-027996

(51) Int. Cl.⁷ ............................ G01M 3/24; G21C 17/00; F17D 5/02; F16K 41/04
(52) U.S. Cl. ................................ 73/37; 73/40.7; 73/49.2
(58) Field of Search ................................ 73/37, 49.2, 46, 73/40, 40.7

(56) References Cited

U.S. PATENT DOCUMENTS

| | | | |
|---|---|---|---|
| 3,451,259 | * 6/1969 | McNulty | 73/40.5 |
| 3,864,960 | * 2/1975 | Fletcher et al. | 73/46 |
| 4,019,371 | * 4/1977 | Chaplin et al. | 73/46 |
| 4,410,186 | * 10/1983 | Pierce, Jr. et al. | 277/2 |
| 4,527,804 | * 7/1985 | Spencer | 277/1 |
| 4,723,441 | * 2/1988 | Sweeney | 73/40.5 R |
| 4,773,256 | * 9/1988 | Saulgeot | 73/40.7 |
| 4,984,450 | * 1/1991 | Bürger | 73/40.7 |
| 5,074,663 | * 12/1991 | Winterton et al. | 356/244 |
| 5,170,659 | * 12/1992 | Kemp | 73/46 |
| 5,172,583 | * 12/1992 | Tallon | 73/40.7 |
| 5,182,076 | * 1/1993 | De Seroux et al. | 376/250 |
| 5,369,983 | * 12/1994 | Grenfell | 73/40.7 |
| 5,372,352 | * 12/1994 | Smith et al. | 251/214 |
| 5,375,456 | * 12/1994 | Burns | 73/40.7 |
| 5,407,447 | * 4/1995 | Johnston et al. | 73/40 |
| 5,979,222 | * 11/1999 | Manalio | 73/37 |
| 6,000,278 | * 12/1999 | Hystad | 73/46 |

FOREIGN PATENT DOCUMENTS

| | | |
|---|---|---|
| 47-28981 | 11/1972 | (JP) . |
| 59-20139 | 2/1984 | (JP) . |
| 6-501300 | 2/1994 | (JP) . |
| 6-69524 | 9/1994 | (JP) . |

* cited by examiner

Primary Examiner—Hezron Williams
Assistant Examiner—David J. Wiggins
(74) Attorney, Agent, or Firm—Scully, Scott, Murphy & Presser

(57) ABSTRACT

The present invention relates to a sealed vessel and a method of testing air tightness of the vessel. In the sealed vessel, the vessel body and a lid are sealed with two O-rings. The sealed vessel has a hole communicating the space sandwiched by the O-rings and the outside of the sealed vessel and a hole communicating the inside and outside of the sealed vessel. In case of testing the air tightness of the inner O-ring, gaseous helium is injected into the space sandwiched by the O-rings and the gaseous helium spread into the vessel is measured. In case of testing the air tightness of the outer O-ring, the vessel is pressurized by the gaseous helium from the outside and the gaseous helium spread in the space sandwiched by the O-rings is measured.

6 Claims, 5 Drawing Sheets

SEALED VESSEL AND METHOD OF TESTING THE SAME

BACKGROUND OF THE INVENTION

The present invention relates to the structure of a vessel sealed with a double seal and, more particularly, to a sealed vessel whose air tightness property in each seal part can be easily checked and a method of testing the air tightness of the sealed vessel.

When an electronic apparatus is installed in the water such as on the sea bottom or in a river, the apparatus is usually housed in a pressure-proof sealed vessel. It is important to sometimes check the air tightness performance of the sealed vessel. In order to check the air tightness performance, an air tightness test using gaseous helium is usually carried out. A typical pressure-proof sealed vessel has a structure such that a lid is attached to an end face of a cylindrical vessel. The pressure-proof sealed vessel and the lid are usually sealed with a double seal. A through hole communicating the inside and outside of the pressure-proof sealed vessel is formed through the lid. A pin is inserted in the through hole and can be sealed by welding. In case of testing the vessel, a sealed vessel to be tested is placed in a pressure test vessel. A vacuum pump arranged outside of the pressure test vessel produces a near vacuum in the vessel via a pipe attached to the through hole. After that, the pipe is switched from the vacuum pump to a gas sensor and the gaseous helium is introduced into the pressure test vessel and is pressurized. When there is a leak in the seal part, the gas sensor senses the gaseous helium spread into the vessel. When the sealed vessel has the double seal, however, it is difficult to check the performance of each of the two seals. In the air tightness test, the pressure of the pressurized gaseous helium is applied to the outer seal and a pressure of about a normal air pressure is applied to the seal on the inside. It requires a long time air tightness test to verify that the gas is leaked from the inner seal part.

When a metal seal is employed as one of the seals, the gas does not permeate the seal part. In the conventional test, therefore, the air tightness performance of the other seal cannot be checked.

SUMMARY OF THE INVENTION

It is an object of the present invention to test each of seals of a sealed vessel having a double seal easily and in short time. In order to achieve the object, in a first sealed vessel of the invention in which a lid is fitted with a double seal, a first hole communicating the space sandwiched by the seals and the outside of the sealed vessel and a second hole communicating the inside and the outside of the sealed vessel are formed. Both of the first and second holes can be formed through either the lid or the vessel. It is also possible that one of the holes is opened in the lid and the other hole is opened in the vessel. According to a second sealed vessel of the invention, peripheries of opening parts of two vessels each having one opening are jointed via a double seal, a first hole communicating the space sandwiched by the seals and the outside of the sealed vessel and a second hole communicating the inside and the outside of the sealed vessel are formed. A method of testing the vessel comprises the steps of injecting a gas into a space sandwiched by the seals, setting the inside of the sealed vessel in a vacuum or low air pressure state, and sensing the injected gas in the sealed vessel. Another testing method comprises the steps of placing the sealed vessel in a pressure vessel, injecting a gas into the pressure vessel, setting the space sandwiched by seals of the sealed vessel in a vacuum or low air pressure state, and sensing the gas in the space sandwiched by the seals. A method of testing a sealed vessel obtained by jointing the peripheries of opening parts of two vessels each having one opening via a double seal comprises the steps of injecting a gas into a space sandwiched by the seals, setting the inside of the sealed vessel in a vacuum or low air pressure state, and sensing the gas in the sealed vessel. The testing method further comprises the steps of placing the sealed vessel in the pressure vessel, injecting the gas into the pressure vessel, setting the space sandwiched by the seals in a vacuum or low air pressure state, and sensing the gas in the space sandwiched by the seals. According to the above-mentioned sealed vessel and the method of testing the vessel, the sealing performance of the two seals can be individually checked and the test time can be shortened.

BRIEF DESCRIPTION OF THE DRAWINGS

The above and other objects, features and advantages of the present invention will become apparent from the following detailed description when taken with the accompanying drawings in which.

DETAILED DESCRIPTION OF THE PREFERRED EMBODIMENTS

Figure 1:
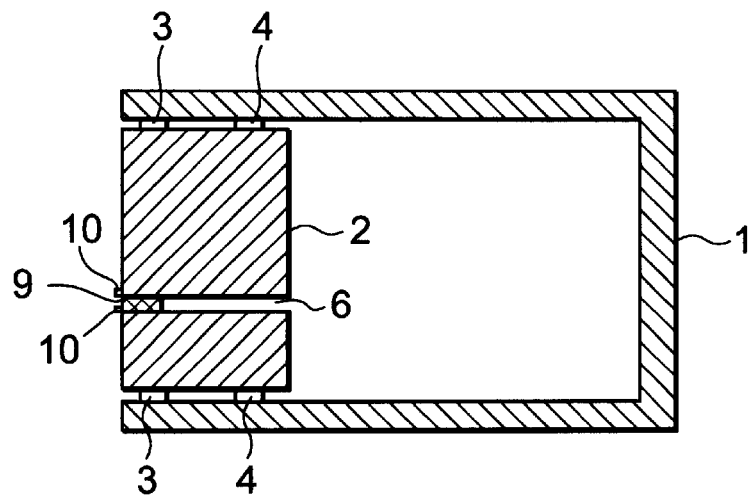
FIG. 1 is a cross section of a conventional sealed vessel provided with a double seal.
Figure 2:
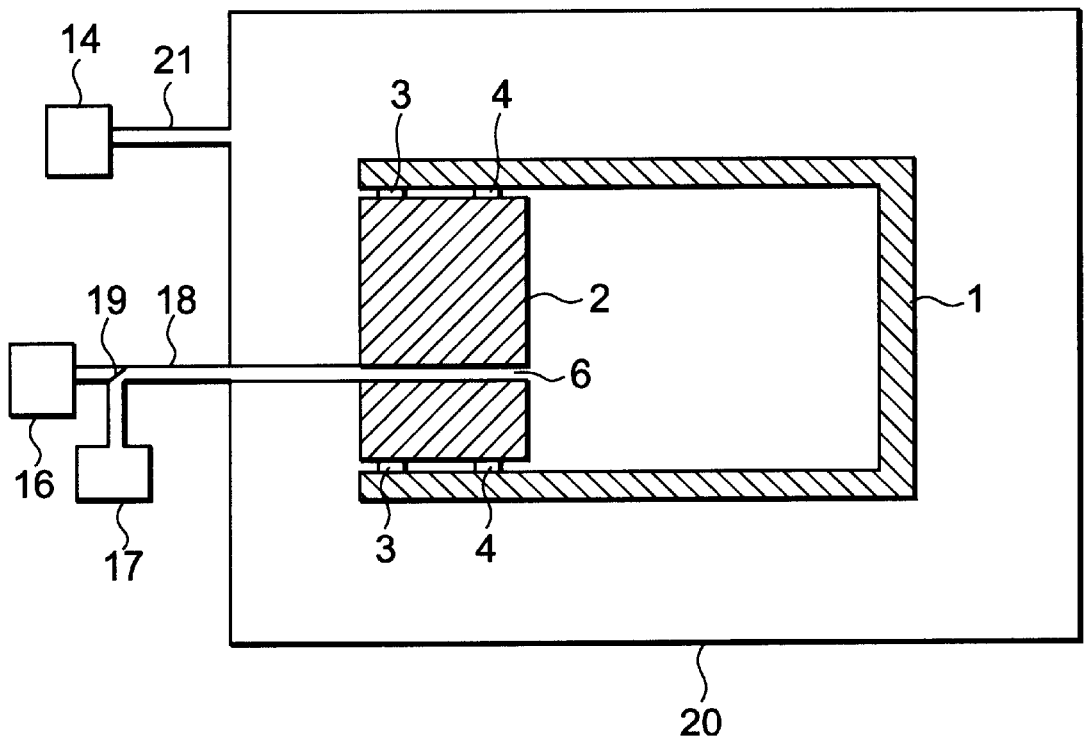
FIG. 2 is a cross section showing a method of testing the conventional sealed vessel.

In a conventional sealed vessel shown in FIG. 1, a lid 2 is attached to the opening of a cylindrical vessel 1. The vessel 1 is doubly sealed with seals 3 and 4 attached between the vessel 1 and the lid 2. The lid 2 has a test hole 6 communicating the space in the vessel 1 and the outside. A pin 9 is inserted in the test hole 6 and is sealed with a welding part 10. In a test of the sealed vessel 1, as shown in FIG. 2, the sealed vessel 1 is first placed in a pressure vessel 20. A vacuum pump 16 and a gas sensor 17 are connected via a pipe 18 to the test hole 6 opened in the lid 2. A gas pressurizing pump 14 is connected to the pressure vessel 20 via a pipe 21. A valve 19 allows selection between the vacuum pump 16 and the gas sensor 17. In the test, first, the vacuum pump 16 produces a vacuum in the sealed vessel 1. The valve 19 switches the pipe 18 leading to the test hole 6 to the gas sensor 17 side. After that, the gas pressurizing pump 14 sends the gaseous helium into the pressure vessel 20. The gas sensor 17 measures the gaseous helium passing through the seals 3 and 4 into the sealed vessel 8. In the method, however, the seals 3 and 4 cannot be independently tested.

Figure 3B:
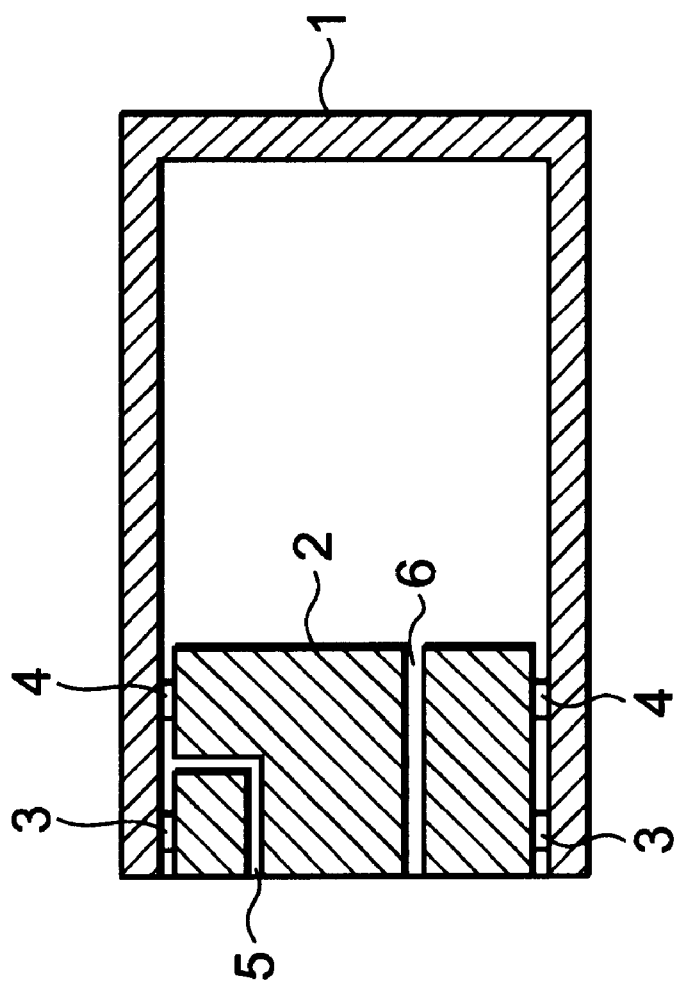
FIGS. 3A and 3B are side view and cross section of a sealed vessel, respectively, of the invention.
Figure 3A:
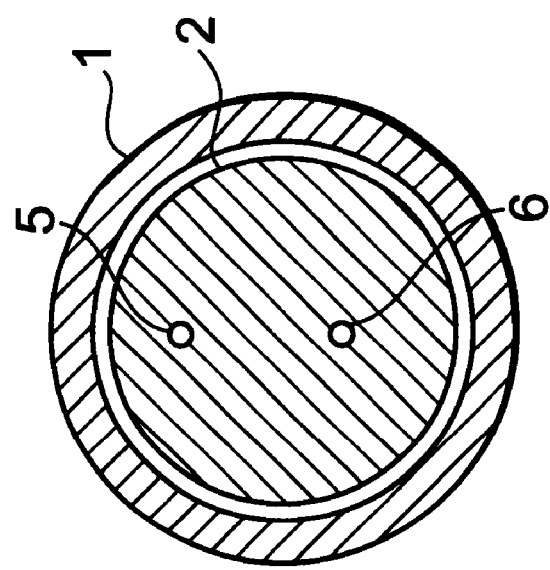
Figure 4:
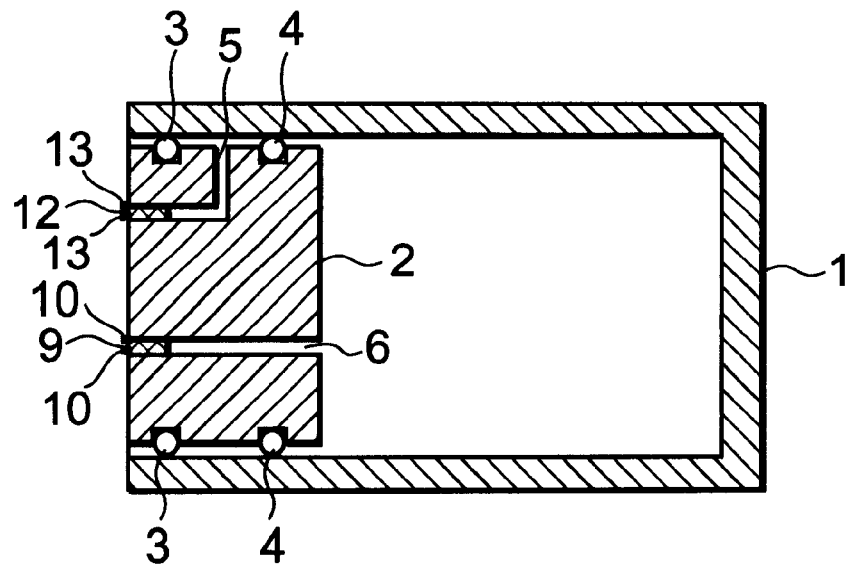
FIG. 4 is a cross section of the sealed vessel which is sealed by welding.

In FIGS. 3A and 3B, the sealed vessel 1 of the invention is basically similar to the structure of FIG. 1. In the sealed vessel 1 of the present invention, however, the lid 2 has a test hole 5 communicating the space between the seals 3 and 4 and the outside space. Each of the seals 3 and 4 is an O-ring. The cylindrical vessel 1 and the lid 2 are made of a metal material such as stainless steel, aluminium, and copper alloy. When prevention of corrosion caused by an electrochemical reaction is considered, it is preferable that the cylindrical vessel 1 and the lid 2 are made of the same material. The thickness of the vessel 1 is approximately 2 to 3 cm at the maximum. For example, the O-ring 3 is made by a gasket or welding and the O-ring 4 is made by a gasket. FIG. 4 shows a state where the test holes 5 and 6 of the cylindrical sealed vessel shown in FIGS. 3A and 3B are closed with the pins 9 and 12 by welding 10 and 13. In sealing the test holes 5 and 6, to facilitate a check of the air tightness, both the pressure fitting of the metal and welding are employed.

Figure 5:
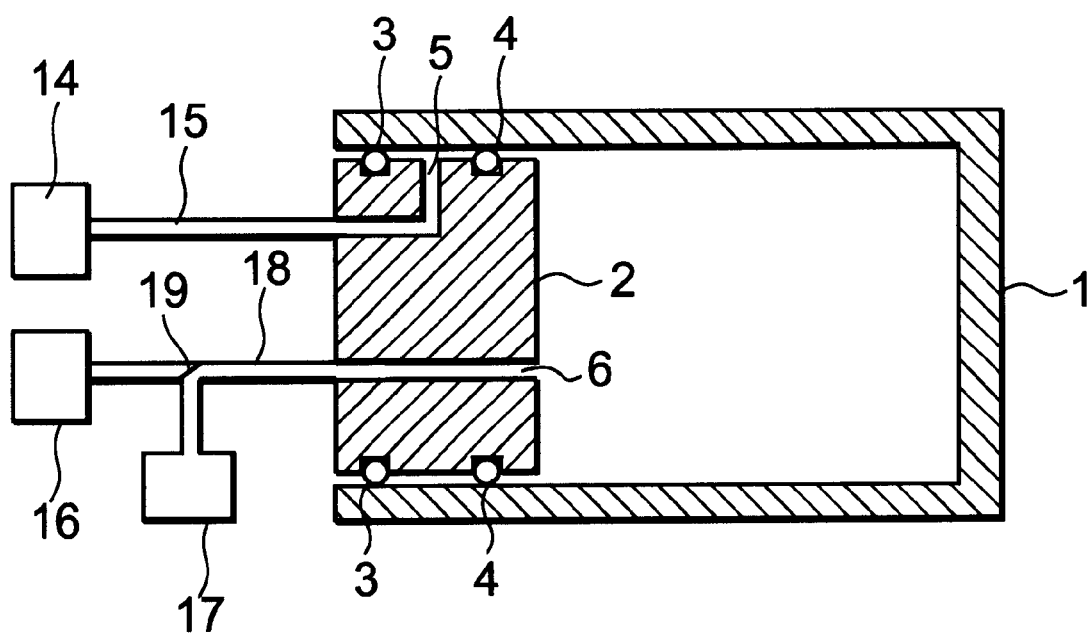
FIG. 5 is a cross section showing a method of testing the sealed vessel of the invention.
Figure 6:
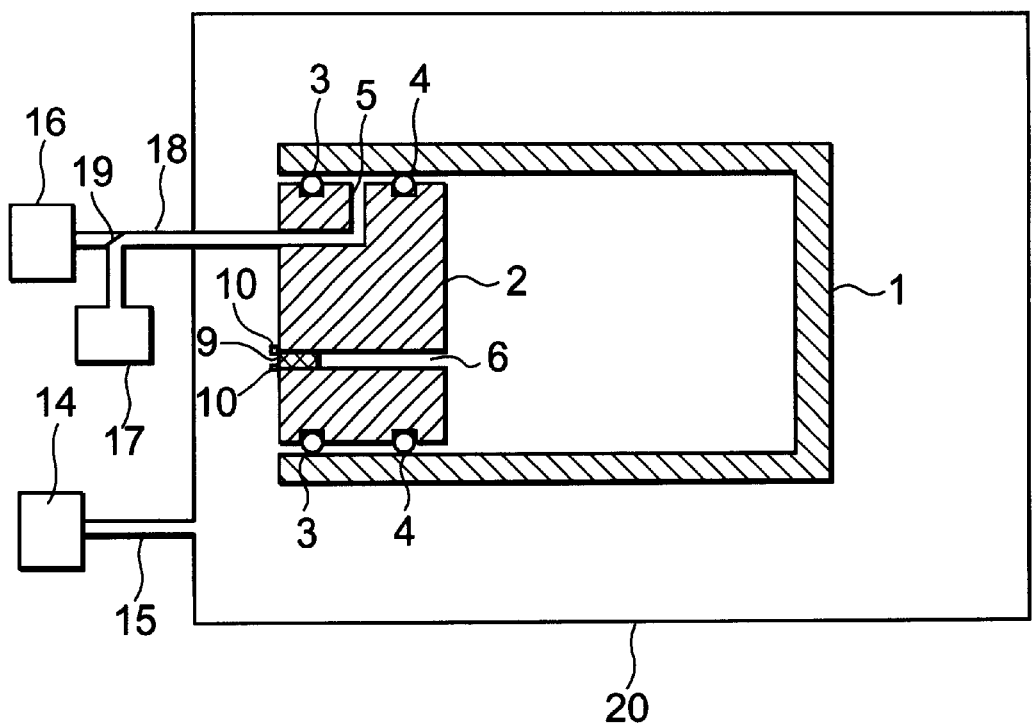
FIG. 6 is a cross section showing a method of testing the sealed vessel of the invention.

The method of testing the sealing of the sealed vessel will be described hereinbelow. FIG. 5 shows a sealed vessel and a test apparatus which are configured in order to test the air tightness characteristics of the inner seal, that is, the O-ring 4. The gas pressurizing pump 14 is connected to the test hole 5 via the pipe 15. The vacuum pump 16 and the gas sensor 17 are connected to the test hole 6 via the pipe 18. The valve 19 is set at the branch of the vacuum pump 16 and the gas sensor 17 in the pipe 18. The valve 19 allows switching between the vacuum pump 16 and the gas sensor 17. After the sealed vessel 1 and the test apparatus are configured as mentioned above, the O-rings are tested as follows. First, the vacuum pump 16 operates to create a near vacuum in the sealed vessel 1. Then the valve 19 switches from the pipe 18 leading to the test hole 6 to the gas sensor 17 side. After that, the gas pressurizing pump 14 sends the gaseous helium to the space between the seals 3 and 4. After elapse of a predetermined time, the gas sensor 17 measures the gaseous helium permeated the O-ring 4 and spread into the sealed vessel 1. FIG. 6 shows a sealed vessel and a test apparatus configured to test the air tightness characteristics of the outer seal, that is, the O-ring 3. The sealed vessel 1 to be tested is set in the pressure vessel 20. The test hole 6 is sealed with the pin 9. The vacuum pump 16 and the gas sensor 17 are connected to the test hole 5 via the pipe 18. The gas pressurizing pump 14 is connected to the pressure vessel 20 via the pipe 15. The valve 19 allows switching between the vacuum pump 16 and the gas sensor 17. In the sealed vessel 1 and the test apparatus configured as mentioned above, the O-rings are tested as follows. First, the vacuum pump 16 creates a near vacuum in the space between the O-rings 3 and 4. Then the valve 19 switches the pipe 18 leading to the test hole 5 to the gas sensor 17 side. After that, the gaseous helium is sent into the pressure vessel 20 by the gas pressurizing pump 14. After elapse of a predetermined time, the gas sensor 17 measures the gaseous helium transmitted the O-ring 3 and spread into the space between the O-rings 3 and 4.

The pressure value of the gaseous helium for pressurization is set to the same value as that of a pressure in an environment in which the sealed vessel is placed. By converting an increased amount of the gaseous helium sensed by the gas sensor 17 to a water vapor content, a humidity increase value in the sealed vessel 1 is estimated.

Figure 7:
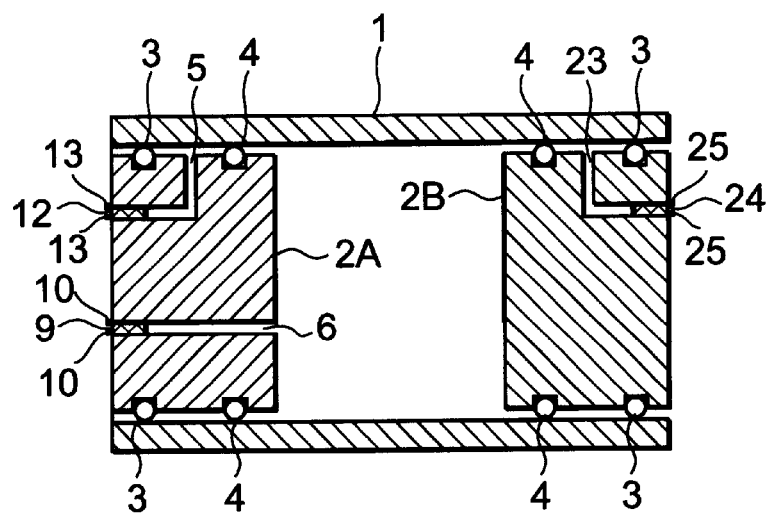
FIG. 7 is a cross section showing another example of the sealed vessel of the invention.
Figure 8:
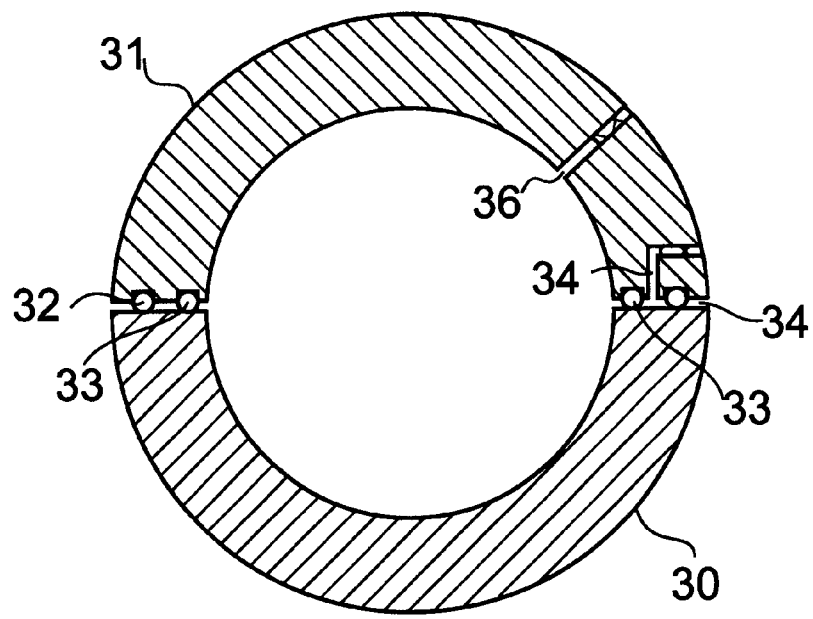
FIG. 8 is a cross section showing another example of the sealed vessel of the invention.

Another configuration example of the invention will be described. In FIG. 7, both openings of the cylindrical sealed vessel 1 are closed with lids 2A and 2B. In the opening on the left side of the vessel 1, the lid 2A having the same structure as that of FIG. 4 is arranged. Two O-rings serving as seals 3 and 4 are attached to a part where the cylindrical vessel 1 and the lid 2 are fitted. The lid 2A has the test hole 5 communicating the space between the two O-rings and the outside and the test hole 6 communicating the inside of the sealed vessel 1 and the outside. The pin 9 is inserted in the test hole 6 and the test hole 6 is sealed with the welding 10. The pin 12 is inserted in the test hole 5 and the test hole 5 is sealed with the welding 13. In the right side opening of the vessel 1, the lid 2B is fitted. Two O-rings 3 and 4 seal the cylindrical vessel 1 and the lid 2B. The lid 2B has a test hole 23 communicating the space between the two O-rings and the outside. A pin 24 is inserted in the test hole 23 and the test hole 23 is sealed by welding 25. In FIG. 8, a sealed vessel 30 having a spherical outer shape is illustrated. Two seals 32 and 33 (specifically, O-rings) seal the joint of hemispheric vessels 30 and 31. The hemispheric vessel 31 has a test hole 34 communicating the space sandwiched by the two O-rings and the outside and a test hole 36 communicating the space in the sealed vessel and the outside. Pins are inserted in the test holes 34 and 36 and the holes are sealed by welding.

Figure 9:
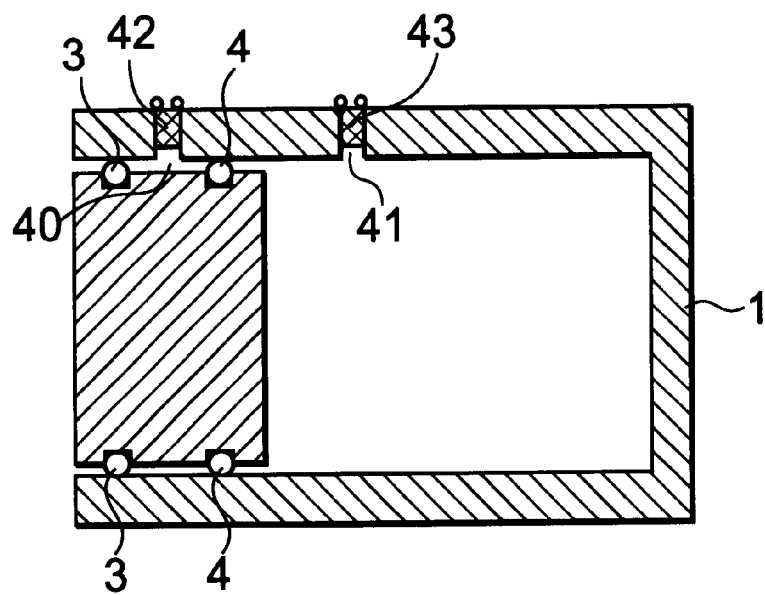
FIG. 9 is a cross section showing another example of the sealed vessel of the invention.

In FIG. 9, the cylindrical vessel 1 has test holes 40 and 41. The cylindrical vessel 1 and the lid 2 are sealed with the two O-rings 3 and 4. The cylindrical vessel 1 has the test hole 40 communicating the space between the O-rings and the outside and the test hole 41 communicating the inside space and the outside. Pins 42 and 43 are inserted in the test holes 40 and 41, respectively, and the test holes can be sealed by welding. In any of the above structures, the test hole can be formed in any position of the cylindrical vessel 1.

According to the invention, the air tightness of the double seal of the sealed vessel can be tested independently in a short time.

While the present invention has been described in connection with certain preferred embodiments, it is to be understood that the subject matter encompassed by the present invention is not limited to those specific embodiments. On the contrary, it is intended to include all alternatives, modifications, and equivalents as can be included within the spirit and scope of the following claims.

What is claimed is:

1. A sealed vessel in which two lids and a vessel body are joined at each of the two lids via two concentric ring seals, a hole communicating the inside and outside of the sealed vessel is formed, and holes each communicating the space sandwiched by the concentric ring seals of each of the two lids and the outside of the sealed vessel are formed therein to enable leakage monitoring or air-tight integrity checking across the two concentric ring seals of each of said two lids of said sealed vessel.

2. A sealed vessel according to claim 1, wherein the first and second holes are formed through one of the lids.

3. A sealed vessel according to claim 1, wherein the first and second holes are formed through the vessel.

4. A sealed vessel according to claim 1, wherein one of the first and second holes is formed through one of the lids and the other is formed through the vessel.

5. A method of leakage monitoring or air-tight integrity testing a sealed vessel in which a lid and a vessel body are joined via two concentric ring seals, comprising the steps of:

injecting a pressurized tracer gas into a space sandwiched by said seals;

setting an air pressure in said sealed vessel to be low;
sensing said gas in said sealed vessel;
placing said sealed vessel in a pressure vessel;
injecting a gas into said pressure vessel;
setting an air pressure in a space sandwiched by said seals to be low; and
sensing said gas in the space sandwiched by said seals.

6. A method of leakage monitoring or air-tight integrity testing a sealed vessel in which opening parts of two vessels are joined via two concentric ring seals, comprising the steps of:

injecting a pressurized tracer gas into a space sandwiched by said seals;
setting an air pressure in said sealed vessel to be low;
sensing said gas in said sealed vessel;
placing said sealed vessel in a pressure vessel;
injecting a gas into said pressure vessel;
setting an air pressure in a space sandwiched by said seals to be low; and
sensing said gas in the space sandwiched by said seals.

* * * * *

UNITED STATES PATENT AND TRADEMARK OFFICE
CERTIFICATE OF CORRECTION

PATENT NO. : 6,279,382 B1
DATED : August 28, 2001
INVENTOR(S) : T. Yatagai

It is certified that error appears in the above-identified patent and that said Letters Patent is hereby corrected as shown below:

<u>Title page,</u>
Item [56] References Cited, U.S. PATENT DOCUMENTS,
"5,407,447" should read -- 5,407,747 --

Signed and Sealed this

Twenty-first Day of May, 2002

Attest:

JAMES E. ROGAN
*Director of the United States Patent and Trademark Office*

*Attesting Officer*